(12) United States Patent
Edsall

(10) Patent No.: US 10,454,928 B2
(45) Date of Patent: Oct. 22, 2019

(54) APPARATUS AND METHOD FOR INSSEC PACKET GENERATION

(71) Applicant: Cisco Technology, Inc., San Jose, CA (US)

(72) Inventor: Thomas James Edsall, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 15/333,906

(22) Filed: Oct. 25, 2016

(65) Prior Publication Data

US 2018/0115548 A1    Apr. 26, 2018

(51) Int. Cl.
*H04L 29/06* (2006.01)
*H04L 12/46* (2006.01)

(52) U.S. Cl.
CPC ........ *H04L 63/0876* (2013.01); *H04L 12/462* (2013.01); *H04L 12/4641* (2013.01); *H04L 63/0272* (2013.01); *H04L 63/0428* (2013.01); *H04L 69/16* (2013.01); *H04L 2012/4629* (2013.01)

(58) Field of Classification Search
CPC . H04L 63/0876; H04L 63/0272; H04L 69/16; H04L 12/4641
USPC ......... 713/150, 151, 153, 160; 370/389, 392
See application file for complete search history.

(56) References Cited

U.S. PATENT DOCUMENTS

| | | | |
|---|---|---|---|
| 6,134,665 A * | 10/2000 | Klein .................... | G06F 1/3209 713/300 |
| 7,483,423 B2 | 1/2009 | Grewal et al. | |
| 7,853,691 B2 | 12/2010 | Elzur et al. | |
| 8,707,020 B1 * | 4/2014 | Lengyel .............. | H04L 63/0428 370/252 |
| 8,966,240 B2 | 2/2015 | Chopra | |
| 9,692,698 B2 * | 6/2017 | Cherian ................ | H04L 45/745 |
| 2008/0123652 A1 * | 5/2008 | Akyol .................. | H04L 12/4633 370/392 |
| 2014/0226820 A1 * | 8/2014 | Chopra ............... | H04L 63/0485 380/277 |
| 2015/0131798 A1 * | 5/2015 | Chopra ................... | H04L 45/50 380/270 |
| 2015/0207793 A1 * | 7/2015 | Mohamed ............. | H04L 63/166 726/6 |
| 2015/0237175 A1 * | 8/2015 | Michael ................. | H04L 69/22 370/474 |

(Continued)

OTHER PUBLICATIONS

"Media Access Control (MAC) Security," IEEE Standard for Local and metropolitan area networks, IEEE Computer Society, Std 802.1AE™, 2006, 154 pages.

(Continued)

*Primary Examiner* — Mohammad W Reza
*Assistant Examiner* — Moeen Khan
(74) *Attorney, Agent, or Firm* — Meunier Carlin & Curfman LLC

(57) ABSTRACT

Techniques are provided herein to achieve data security and integrity using the cryptographic machinery of IEEE MAC-Sec for TCP or UDP packets, for example, VxLAN, iVx-LAN, and VxLAN-GPE packet. In particular, the disclosed techniques generate InsSec packets from received VxLAN based packets, in which the generated InsSec packets include an integrity checksum that that does not cover the MAC address of the packet.

20 Claims, 7 Drawing Sheets

(56) References Cited

U.S. PATENT DOCUMENTS

2016/0337083 A1* 11/2016 Englert ................ H04L 1/0061

OTHER PUBLICATIONS

"Virtual Extensible LAN (VXLAN) Overview," Arista: VXLAN: Scaling Data Center Capacity, White Paper, 2014, 7 pages.
"VPN Tunneling Protocols," Microsoft, accessed from technet.microsoft.com on Jun. 6, 2016, 3 pages.
"VXLAN Overview: Cisco Nexus 9000 Series Switches," Cisco, White Paper, 2015, 10 pages.

* cited by examiner

APPARATUS AND METHOD FOR INSSEC PACKET GENERATION

TECHNICAL FIELD

The present disclosure relates to communication networks.

BACKGROUND

Media Access Control (MAC) Security (MACsec), defined in the IEEE 802.1AE standard, is a connectionless secure communication protocol that was initially defined for point-to-point security between two devices. Over time, usage of MACsec has been extended to provide end-to-end encryption across a third party network using tunnels, bridges, and labels.

Virtual extensible local area network (VxLAN) provides a layer-2 overlay over a layer-3 network. It relies on use of MAC Address-In-User Datagram Protocol (MAC-in-UDP) encapsulation to provide a means to extend layer-2 segments across an interconnected data center network.

Multi-site datacenters that provide data center interconnect solutions can be used to apply native VxLAN or iVxLAN encapsulation and to create an IP tunnel over a network between datacenters.

BRIEF DESCRIPTION OF THE DRAWINGS

To facilitate an understanding of and for the purpose of illustrating the present disclosure, exemplary features and implementations are disclosed in the accompanying drawings, it being understood, however, that the present disclosure is not limited to the precise arrangements and instrumentalities shown, and wherein similar reference characters denote similar elements throughout the several views, and wherein.

DESCRIPTION OF EXAMPLE EMBODIMENTS

Overview

Figure 1A:
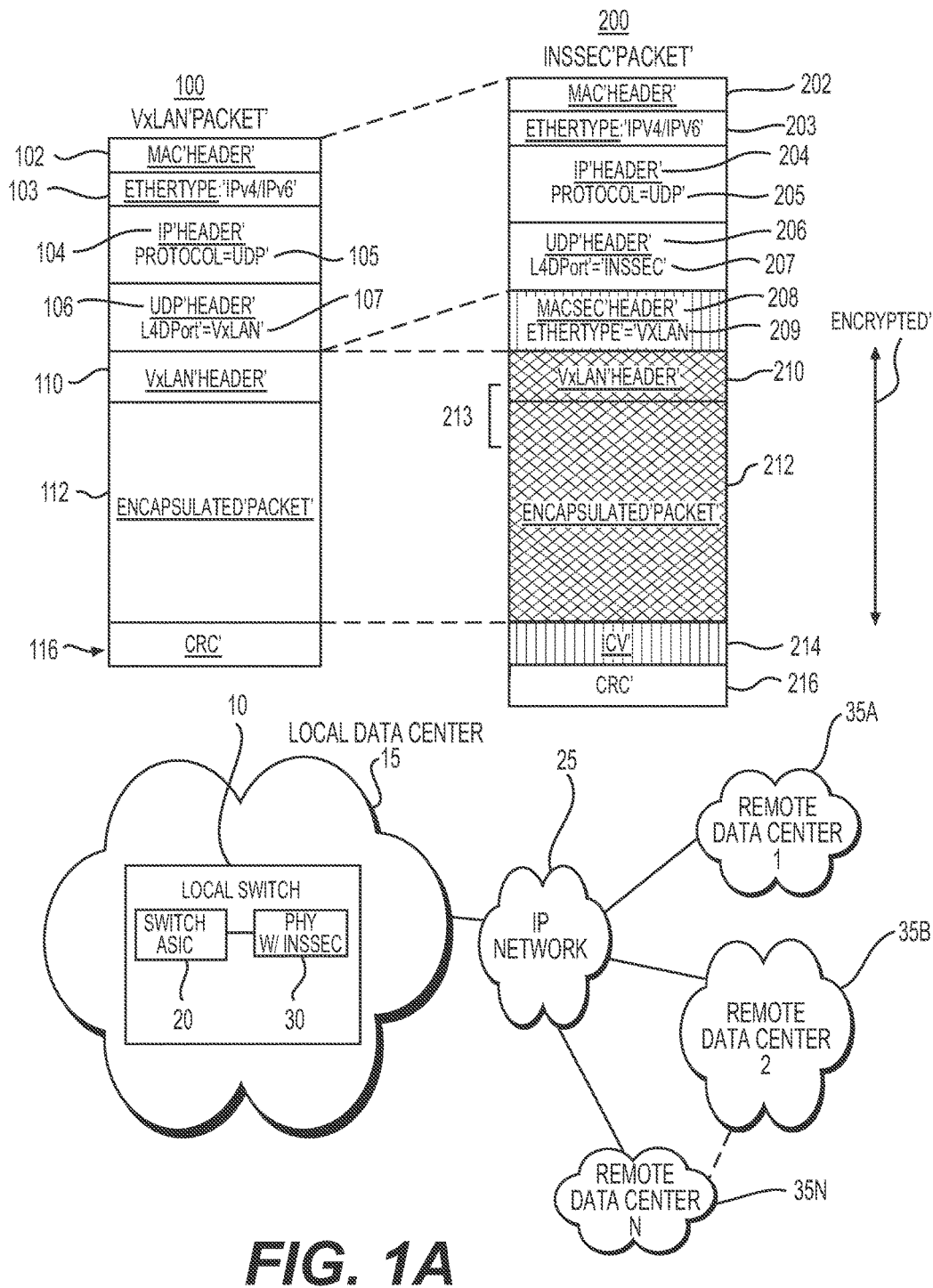
FIG. 1A is a block diagram illustrating an example network environment in which a switch is deployed to generated InsSec packets (e.g., from VxLAN packets) in accordance with an embodiment.

Techniques are provided herein to achieve data security and integrity using the cryptographic machinery of IEEE MACSec for TCP or UDP packets, for example, VxLAN, iVxLAN, and VxLAN-GPE packet. In particular, the disclosed techniques generate InsSec packets from received VxLAN based packets, in which the generated InsSec packets include an integrity checksum that that does not cover the MAC address of the packet.

Example Embodiments

Certain terminology is used herein for convenience only and is not to be taken as a limitation on the present invention. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements.

Referring first to FIG. 1A, a network environment is shown comprising a local switch 10 that is used provide data center interconnect one or more datacenters for a network, e.g., interconnect a local data center 15 to one or more remote data centers 35A-N over an IP network 25. As used herein, the "switch" includes switches, routers, and switch-routers. "InsSec" refers to the MACSec based encryption and data integrity checking processes disclosed herein. "MACSec" refers to the Institution of Electronical and Electronics Engineers (IEEE) Media Access Control (MAC) Security standard (known by the designation IEEE 902.1AE) that defines connectionless data confidentiality and integrity for media access independent protocols. A MACsec connection, as defined by IEEE 802.1AE, is a point-to-point connection. In this sense, it is referred to as a "connectionless" protocol. The MACsec standard does not specify launching a VxLAN tag from the encrypting device itself to allow switching/steering information to be populated based on the unencrypted data. As used herein, "VxLAN" packets refers to a category of VxLAN based packets, such as VxLAN, iVxLAN, and VxLAN-Generic Protocol Extension (VxLAN-GPE).

In certain embodiments, as shown in FIG. 1A, the local switch 10 comprises a switch ASIC 20 and an InsSec physical layer (PHY) device 30. The local switch 10 is an example of a network device that performs connectionless secure communication and network routing of packets in a network, in which VxLAN packets 100 are transformed into InsSec packets 200 and routed over an InsSec tunnel. The local switch 10 can be used to facilitate, for example, Application Centric Infrastructure (ACI) solutions that implement multiple data center interconnect (DCI).

Figure 1B:
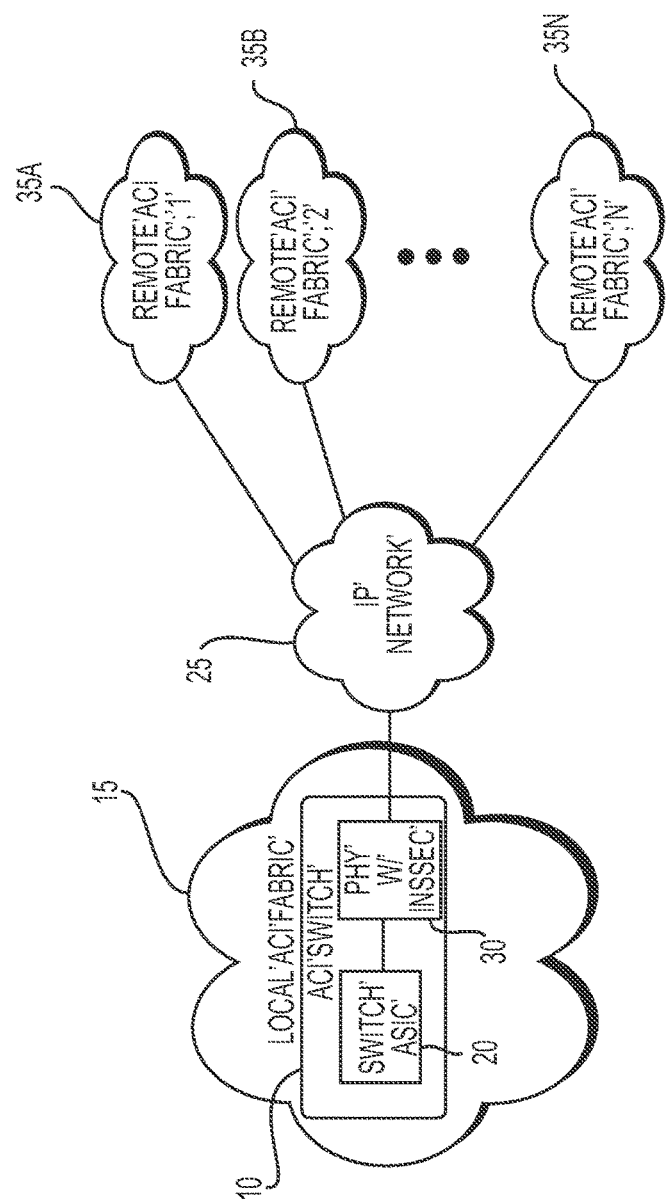
FIG. 1B is a block diagram illustrating another example of a network environment in which a switch is deployed to generated InsSec packets (e.g., from VxLAN packets) in accordance with another embodiment.

FIG. 1B illustrates an example network environment of an example ACI infrastructure. ACI generally provides a multi-side data center strategy to address disaster recovery, scale, and continuous operations. The switch ASIC 20 can provide for VxLAN encapsulation to send packets "over the top" of an IP network 25 between the data centers 35A-N to create a DCI tunnel from one site to the next using VxLAN. As shown in FIG. 1B, in certain embodiments the switch ASIC 20 can be a single physical interface on an ACI switch 10, for example, a leaf or a spine switch of a layer-2 network topology where a DCI tunnel is terminated. In certain embodiments, the switch ASIC 20 can be used to communicate to 127 other ACI data centers 35A-N, which can each include their own ACI switch 10. The switch ASIC 20 can handle various kinds of other traffic, for example, in certain embodiments the switch ASIC 20 can handle traffic that is not encrypted or traffic that has not been VxLAN encapsulated.

One exemplary function performable by the InsSec PHY 30 is the generation of InsSec packets 200 from received VxLAN packets 100. In particular, the InsSec PHY 30 receives a packet, determines whether the received packet is a VxLAN packet, and then transforms the VxLAN packet into an InsSec packet. This transformation can be performed by applying an InsSec egress process in accordance with the present disclosure (see for example, InsSec egress method 300 of FIG. 3, which is described in detailed below). It should be understood that in certain embodiments the packet received is assumed to be a VxLAN packet, and thus the operation of determining of whether the received packet is a VxLAN packet need not be performed.

In certain embodiments, the InsSec PHY 30 may additionally or alternatively generate VxLAN packets 100 from received InsSec packets 200. This can be performed by receiving a packet, determining that the packet is an InsSec packet, and then executing an InsSec ingress process in accordance with the present disclosure (see for example, InsSec ingress method 400 of FIG. 4, which is described in detailed below). It should be understood that in certain embodiments the packet received is assumed to be an InsSec packet, and thus the operation of determining of whether the received packet is an InsSec packet need not be performed.

It should be understood that InsSec egress and/or ingress can be performed by various devices. For example, InsSec egress and/or ingress can be performed by an ASIC that is external to the switch ASIC 10, like PHY device 30 shown in FIGS. 1A-B. In certain embodiments, the InsSec PHY 30 can be external to the switch ASIC 20, in which switch ASIC 20 performs policy functions and other processing of VxLAN packets. In certain embodiments, InsSec is implemented within the switch ASIC 20 itself as opposed to by an external device. AS shown in FIG. 1B, in certain embodiments, each Remote ACI Fabric 35A-N can include a corresponding ACI switch 10 that terminates an InsSec tunnel on behalf of the respective fabric. As shown in FIGS. 1A-B, InsSec packets may be exchanged between any two fabrics.

As illustrated in FIG. 1, in certain embodiments a VxLAN packet 100 includes a MAC header 102, an internet protocol (IP) header 104, a User Datagram Protocol (UDP) header or a Transmission Control Protocol (TCP) header 108, a VxLAN header 108, an encapsulated packet 112 carrying an encapsulated packet payload, and a cyclic redundancy code (CRC) 116. Each header can have one or more associated fields. For example, the MAC header 102 includes an EtherType field 103, the IP header 104 includes a protocol field 105. For example, the IP header 103 further includes a TTL field and a checksum field (not shown). The UDP/TCP header 108 includes a layer-4 destination port field 107 comprising a layer-4 destination port number. The UDP/TCP header 108 further includes a UDP/TCP length field and a UDP/TCP checksum field (not shown). It should be understood that in certain embodiments the VxLAN packet 100 can include additional or alternative headers and fields as known to those having ordinary skill in the art.

In accordance with the present disclosure, various InsSec egress techniques are described herein in which the format of a received VxLAN packet 100 is manipulated to generate an InsSec packet 200. In certain embodiments, the manipulation performed includes inserting a MACSec header 208 into a VxLAN packet 100 after the UDT/TCP header 206 of the VxLAN packet, updating the UDP/TCP port number 207 of the UDP/TCP header 206 to indicate the packet is carrying a secured payload, for example, an InsSec payload or a MACSec payload. Moreover, the UDP/TCP length is updated to reflect the additional bytes added to the frame and in certain embodiments the UDP checksum is cleared. The MACSec header 208 includes an EtherType field 209 that is set to indicate that it is carrying a VxLAN payload by copying the layer-4 destination port number of the UDP/TCP a layer-4 destination port field 107 of the VxLAN packet 100. The VxLAN header 110 and the encapsulated packet payload 112 of the VxLAN packet 100 are encrypted using MACSec, thereby generating a MACSec payload 213 comprising an encrypted VxLAN header 210 and an encrypted encapsulated packet payload 212. An integrity check value (ICV) 214 is inserted after the encrypted payload and a correct CRC 216 is placed at the end of the packet. In certain embodiments, the ICV 214 is configured to cover at least the MACSec header 208 and the encrypted payload 213 but not the MAC header 202. In certain embodiments, the ICV 214 is configured to cover at least the MACSec header 208, the encrypted payload 213, and the UDP or TCP header 206, but not the MAC header 202. In certain embodiments. In certain embodiments, the ICV 214 is configured to cover at least the MACSec header 208, the encrypted payload 213, the UDP or TCP header 206, and a portion IP header 204 but not the MAC header 202. In certain embodiments, the portion of the IP header 204 can include any combination of IP header fields except for the TTL and checksum fields of the IP header. In other embodiments, the portion of the IP header 204 can include any combination of one or more IP header 204 fields, for example the protocol field 205.

Figure 2:
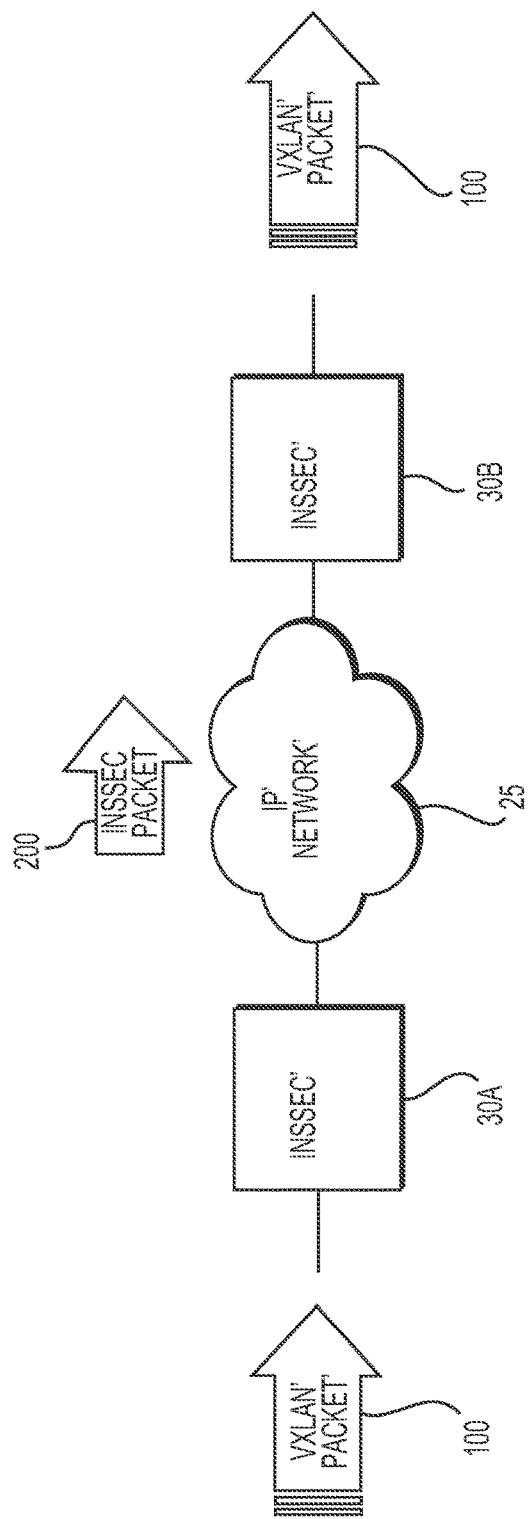
FIG. 2 is block diagram illustrating an example logical model for applying the egress and ingress operations in accordance with an embodiment.

FIG. 2 illustrates an example logic model, in which both InsSec egress and ingress techniques may be performed. By way of example, the logical model depicts a secure tunnel between two InsSec endpoints blocks 30A-B. In particular, the example logic model includes presenting a VxLAN packet 100 to an egress InsSec block 30A, which then sends an InsSec packet over the IP network 20 via a secure tunnel to aningress InsSec block 30B. The ingress InsSec block 30B then decrypts the InsSec packet 200 and delivers a corresponding VxLAN packet 100 in the clear. In certain embodiments, the egress InsSec block 30A and the ingress InsSec block 30B are performed by two or more devices. In certain embodiments, the egress InsSec block 30A and the ingress InsSec block 30B are both performed by the same device.

InsSec Egress Process

Figure 3:
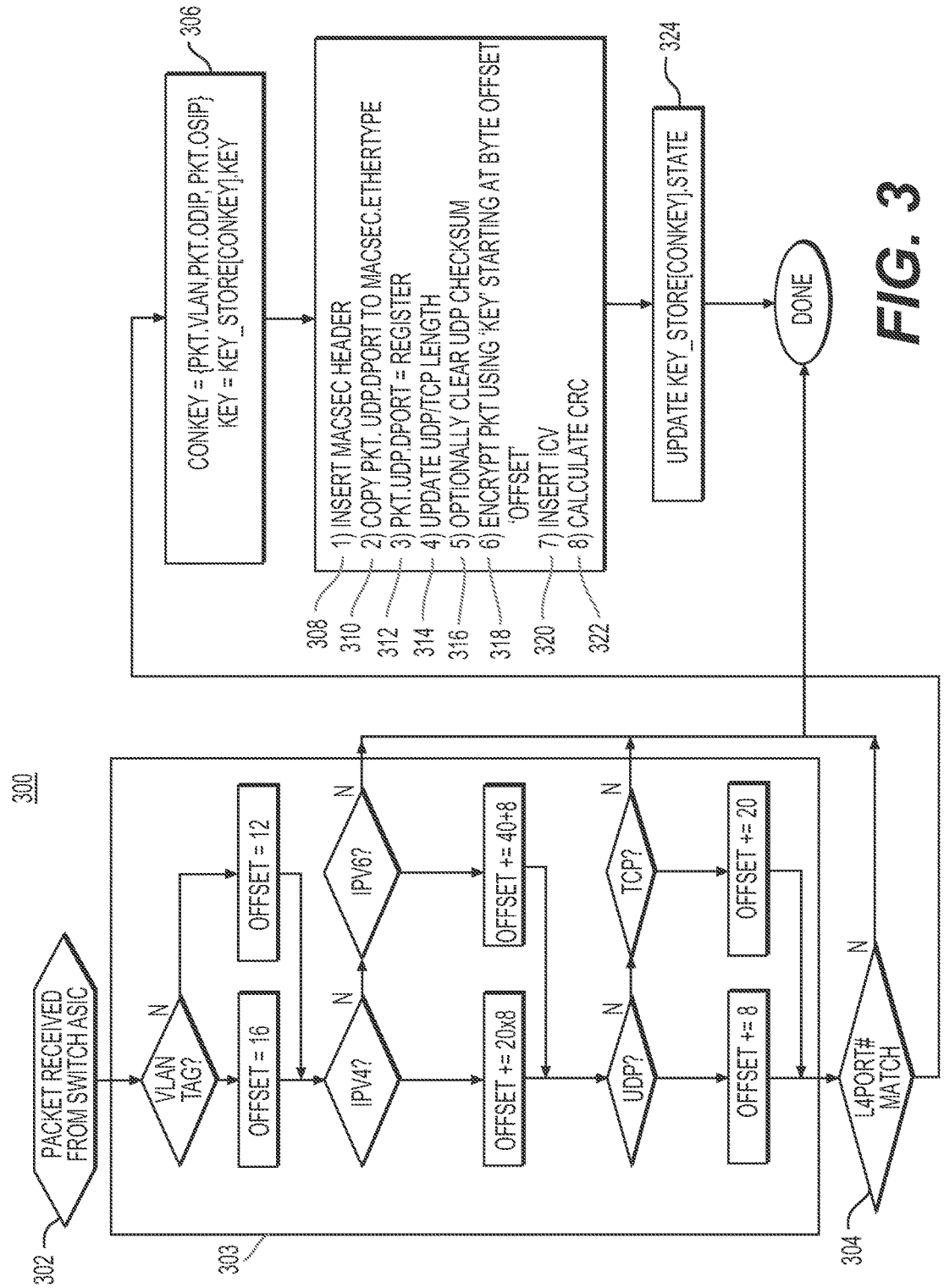
FIG. 3 is a flow chart depicting example egress operations to generate InsSec packets by encrypting VxLAN based packets in accordance with an embodiment.

Reference is now made to FIG. 3 for a description of operations of an example InsSec egress process 300 for generating an InsSec packet 200 from a VxLAN packet 100 in accordance with the present disclosure. The InsSec egress process 300 can be performed by the components (either in hardware or software or combination thereof) shown in FIG. 1. The process 300 can be used to determine which packets are to be encrypted, with which keys, and what offsets in the packets to use. At 302, a packet is received from the network, for example, through the switch ASIC 20. At 303, an offset is calculated for use in encryption based on the fields of the packet. For example, the offset may be calculated by setting an initial offset and then incrementing the offset based on certain packet field criteria. In certain embodiments, if a VLAN tag is detected within the packet then the initial offset is 16 bytes and if no VLAN is detected then the initial offset is 12 bytes. The VLAN tag can be, for example, an 802.1Q VLAN tag. The initial offset can then be incremented by a single field criteria, or various combinations of field criteria, for example, a combination of EtherType (IPv4 or IPv6) and protocol (UDP or TCP). In certain embodiments, the initial offset is incremented by 28 if the packet is an IPv4 packet and incremented by 48 if the packet is an IPv6 packet. In certain embodiments, the offset is further incremented by 8 if the packet is a UDP packet and by 20 bytes if the packet is a TCP packet. Accordingly, if the above criteria is applied the resulting offset would be: 52 bytes for a UDP IPv4 packet having a VLAN tag; 72 bytes for a UDP IPv6 packet having a VLAN tag; 64 bytes for TCP IPv4 packet having a VLAN tag; 84 bytes for TCP IPv6 packet having a VLAN tag; 48 bytes for a UDP IPv4 packet not having a VLAN tag; 68 bytes for a UDP IPv6 packet not having a VLAN tag; 60 bytes for TCP IPv4 packet not having a VLAN tag; and 80 bytes for TCP IPv6 packet not having a VLAN tag. In certain embodiments, the offset may be predetermined. For example, if the InsSec ingress process 300 receives packets only having a fixed IP header size, then the calculated offset can be predetermined and the calculation step is simplified. For example, in certain ACI fabric environments, fabrics create IP headers without options, and thus the IP header size of such packets would be fixed.

At 304, it is determined whether the received packet is a VxLAN based packet by comparing the layer-4 port number of the UDP/TCP header of the received packet to a register associated with known VxLAN based packets to identify a match. The register can be for example, a VxLAN register, an iVxLAN register, a VxLAN-GPE register, or any other suitable layer-4 port number. In certain embodiments, the layer-4 port number is compared to more than one register. In such a case any number of two or more suitable registers may be used. In certain embodiments, a setting may be set as part of a stored key store state to indicate whether and which of the registers are to be enabled for matching. For example, the register(s) used at 304 may be selected on a per connection basis, and for each register the state may indicate whether the register applies to UDP, TCP or both. In certain embodiments, the egress process will only seek to match UDP VxLAN, UDP iVxLAN, and UDP VxLAN-GPE registers. In other embodiments TCP as well as other layer-4 ports numbers are matched.

At 306, an encryption key is determined by accessing an entry in a key store table using a corresponding a table key. The table key may be selected from the group consisting of a packet outer destination IP address, a packet outer source IP address, a packet outer VLAN ID, and combinations thereof. In certain embodiments, the table key comprises the packet outer destination IP address (pkt.oDIP), optionally the packet outer source IP address (pkt.oSIP), and the packer outer VLAN ID if present (pkt.oVLAN). The use of the packet outer source IP address (pkt.oSIP) as part of the table key can be set as a global configuration. The key store table can include an entry for each remote data center 30A-N. In certain embodiments, the table size includes 127 entries, which is the target number of remote data centers supported by certain present industry switching ASICs. Any other suitable number of entries may be used. In certain embodiments, the key store table is implemented via a hash table.

In certain embodiments, if the received packet is not IPv4 or IPv6, or not UDP/TCP, or if no matching layer-4 port is found in step 304, or if no corresponding entry in found in the key store table, then the InsSec egress process 300 ends prior to step 308.

By 308, the received packet has been determined to be a VxLAN packet, the encryption key has been identified, the offset used for encrypting has been identified. At 308, a MACSec header is inserted after the UDP/TCP header of the VxLAN packet. In certain embodiments, the MACSec header is inserted directly after the UDP/TCP header before the VxLAN header. At 310, the layer-4 destination port number of the layer-4 destination port field of the UDP/TCP header is copied to the EtherType field of the MACSec header. This facilities recovery of the VxLAN packet 100 when the INSsec packet 200 is later decrypted.

At 312, the layer-4 destination port number of the UDP/TCP header layer-4 destination port field is overwritten with a register. The register can be a predefined layer-4 security port number that indicates that the encrypted VxLAN packet is carrying a given type of secured payload, for example, an InsSec payload or a MACsec payload. In certain embodiments, the content of the register is configured by software, hardware, or combinations thereof. For example, the register can be configured by software with a proprietary layer-4 port number indicating that the resulting egress packet is an InsSec packet.

At 314, the length of the UDP/TCP length field is updated to reflect the additional bytes that are being added. In certain embodiments, at 316 the UDP/TCP checksum is set to all zeros. In certain embodiments, if the packet is a UDP packet, then the option to clear the UDP checksum can be controlled through a software configuration, which can be implemented on a per connection basis. The checksum may be left unchanged in certain embodiments as it would likely be correct when the InsSec packet 200 is later decrypted. In certain embodiments, the UDP checksum is cleared to indicate that there is no checksum, this can be performed if, for example, having a corrected formed checked on the packet while it is encrypted is important. In certain embodiments, if the packet is a TCP packet, it may not be practical to put a correct checksum on the TCP packet after it is encrypted without doing a store and forwarded. In such cases, the TCP checksum can be left unchanged as it will be correct when the InsSec packet 200 is later decrypted.

At 318, the VxLAN packet is encrypted using the key identified in step 306 starting at the byte offset identified in step 302. In certain embodiments, the layer-4 protocol number of the VxLAN packet 100 is also encrypted.

At 320 the ICV is inserted at the end of the packet, between the payload and the CRC. As explained above, in certain embodiments, the ICV 214 is configured to cover at least the MACSec header and the encrypted payload but not the MAC header. In certain embodiments, the ICV 214 is configured to cover at least the MACSec header, the encrypted payload, and the UDP or TCP header, but not the MAC header. In certain embodiments, the ICV is configured to cover at least the MACSec header, the encrypted payload, the UDP or TCP header, and a portion IP header but not the MAC header. In certain embodiments, the portion of the IP header 204 can include any combination of IP header fields except for the TTL and checksum fields of the IP header. In other embodiments, the portion of the IP header 204 can include any combination of IP header fields, for example the protocol field. The ICV coverage can be configured on a per connection basis (stored in the key_store.state). The option to not cover the IP header and the UDP is provided herein as certain middle boxes may wish to modify these headers during the routing process. Some customer scenarios must allow for middle boxes to modify the IP and UDP header while in others one may wish to prevent the middle devices from modifying the packets.

At 322, the CRC of the VxLAN packet is replaced with a new calculated CRC and a resulting InsSec packet 200 is outputted. At 324 state information associated with each encryption key is updated in the key store, such as a packet count for example.

InsSec Ingress Process

Figure 4A:
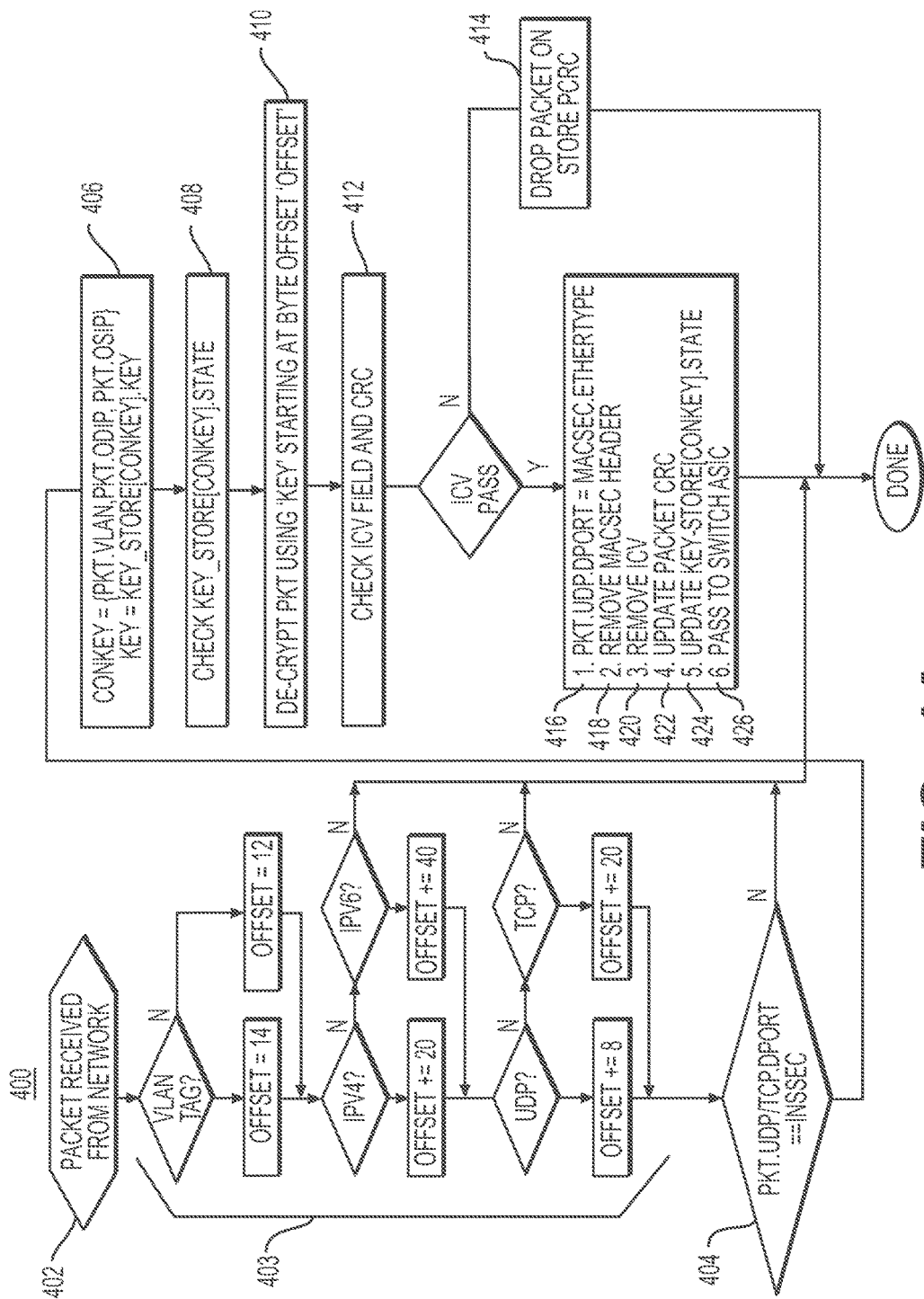
FIG. 4A is a flow chart depicting example ingress operations to generated VxLAN packets by decrypting InsSec packets according to an embodiment.

Reference is now made to FIG. 4A for a description of operations of an example InsSec Egress process 400 for generating a VxLAN packet 100 from an InsSec packet 200 in accordance with the present disclosure. The ingress process 400 can be symmetric to the egress process 300 described above. At 402, a packet is received from the network, for example, through the switch ASIC 20. In certain embodiments, the UDP/TCP checksums are not modified. At 403, similar to 303, an offset is calculated for use in decryption based on the fields of the packet. For example, the offset may be calculated by setting an initial offset and then incrementing the offset based on certain packet field criteria. In certain embodiments, if a VLAN tag is detected within the packet then the initial offset is 16 bytes and if no VLAN is detected then the initial offset is 12 bytes. The VLAN tag can be, for example, an 802.1Q VLAN tag. The initial offset can then be incremented by a single field criteria, or various combinations of field criteria, for example, a combination of EtherType (IPv4 or IPv6) and protocol (UDP or TCP). For example, the initial offset is incremented by 28 bytes if the packet is an IPv4 packet and incremented by 48 bytes if the packet is an IPv6 packet. The offset is further incremented by 8 bytes if the packet is a UDP packet and by 20 bytes if the packet is a TCP packet. Accordingly, if the above criteria is applied the resulting offset would be: 52 bytes for a UDP IPv4 packet having a VLAN tag; 72 bytes for a UDP IPv6 packet having a VLAN tag; 64 bytes for TCP IPv4 packet having a VLAN tag; 84 bytes for TCP IPv6 packet having a VLAN tag; 48 bytes for a UDP IPv4 packet not having a VLAN tag; 68 bytes for a UDP IPv6 packet not having a VLAN tag; 60 bytes for TCP IPv4 packet not having a VLAN tag; and 80 bytes for TCP IPv6 packet not having a VLAN tag. In certain embodiments, the offset may be predetermined. For example, if the InsSec egress process 400 receives packets only having a fixed IP header size, then the calculated offset can be predetermined and the calculation step skipped. For example certain ACI fabrics may create an IP header without options, and thus the IP header size of such packets would be fixed.

At 404, it is determined whether the packet is carrying a payload of a given type of secured payload by identifying whether the packet has a UDP or TCP header that includes a predefined layer-4 security port number (e.g. MACSec payload, InsSec payload). For example, the UDP/TCP header of the packet is checked to determine the packet is an InsSec packet by identifying whether the layer-4 destination port number of the packet's UDP/TCP header matches a predefined InsSec register.

At 406, the key store is accessed using a table key to select a corresponding encryption key. In certain embodiments, the key store may return two or more possible keys. In such a scenario, the MACSec header's TCI/AN field can be utilized to select which encryption key to use. In certain embodiments, multiple keys are necessary when transitioning the key on a connection from one key to another.

At 408, the packet is examined to determine if there is a matching state in the key store table for the packet. At 410, upon the packet being identified as carrying a secured payload (MACSec payload or InsSec payload) and identified as having a matching state in the key store, the packet is decrypted starting at the calculated offset using the encryption key.

At 412, the ICV and CRC fields of the received packet are checked. If the ICV check fails, then, at 414 the packet is dropped and counted or, as a minimum, the CRC is "stomped" and the packet is counted. In certain embodiments, if the packet is not an InsSec packet or there is no state in the key store table for the source IP address, then the packet is left unchanged. If the CRC is bad, then the CRC is stomped so that it is possible to isolate CRC errors occurring between the network and the connection to the switch ASIC 20.

If the ICV check passes, then at 416 the UDP/TCP destination port number is moved from the MCCSec header EtherType field to the UDP/TCP header. At 418, the MACSec header is removed from the packet. At 420, the ICV is removed from the packet. At 422, the CRC is updated. At 422, the packet's corresponding state in the key store is updated. At 424, the resulting packet VxLAN packet 100 is passed to the switch ASIC 20.

In certain embodiments, if there is a matching state in the key store for a packet and if the packet is not an InsSec packet, then the packet is optionally dropped as the packet is in the clear. In certain embodiments, a setting in the key store indicating whether to drop or not drop the clear packet is configured in the key store. The setting can be configured on a per security association basis, i.e. per row of the key store table. In certain environments, this setting can be used to allow a system to initially allow packets to be exchanged in the clear, but once an encrypted channel has been established, software can enforce that all subsequent packets be encrypted.

In certain embodiments, replay protection provided by classical IEEE MACSec is not provided. Replay protection generally makes the assumption that packets are delivered in order or with only slight re-ordering. In certain embodiments, the InsSec environment disclosed herein may be designed to work in a routed, DCI application, and therefore, it is possible in at least some of those embodiments that the packet order assumption does not hold and replay protection is not available. Without re-play protection, certain embodiments of InsSec can run at a 100 Gbps line rate. In certain embodiments, reordering and tracking is provided.

Although the above focuses on scenarios where the layer-4 protocol number is passed in the clear, in certain embodiments the layer-4 protocol number is encrypted as well.

Figure 4B:
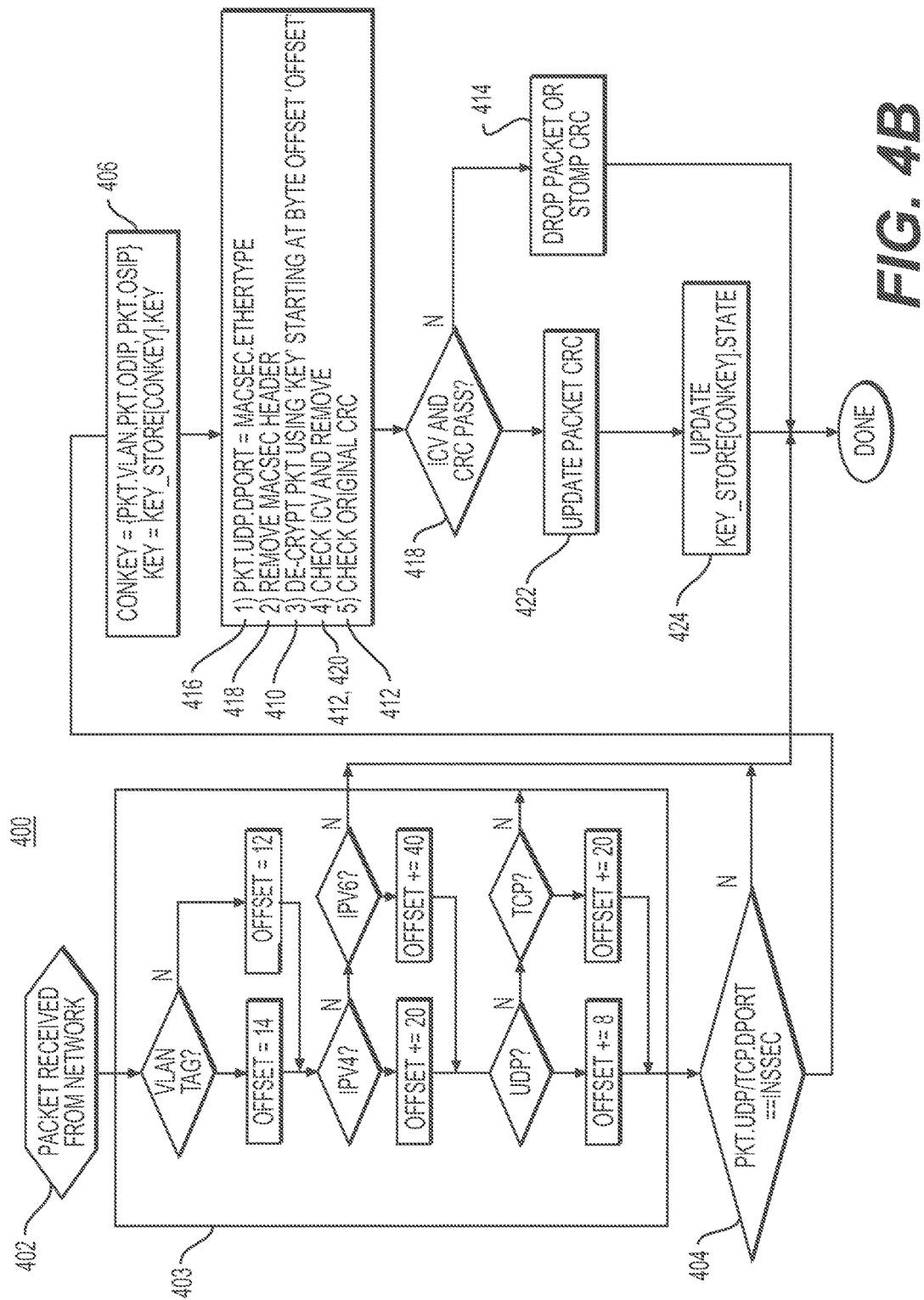
FIG. 4B is a flow chart depicting another example ingress operations to generated VxLAN packets by decrypting InsSec packets according to an embodiment.

It is understood that the certain of the operations described above can be performed in various suitable orders and combinations. FIG. 4B illustrates one such example. In the embodiment shown in FIG. 4B, the operation of decrypting the packet is performed prior to the operation of checking the ICV and CRC value. In said embodiment, the operations of checking the ICV and CRC values and the operation of removing the ICV field, both occur after the decryption operation. Moreover, the ICV and CRC check operations are performed after the operations of removing the MACSec header and the ICV field. In said embodiment, if the ICV and CRC check passes, then the CRC of the packet is updated and the state associated with the packet is updated. If however the ICV and/or the CRC check fail, then the packet is dropped or the CRC is stomped.

InsSec Implementation

Figure 5:
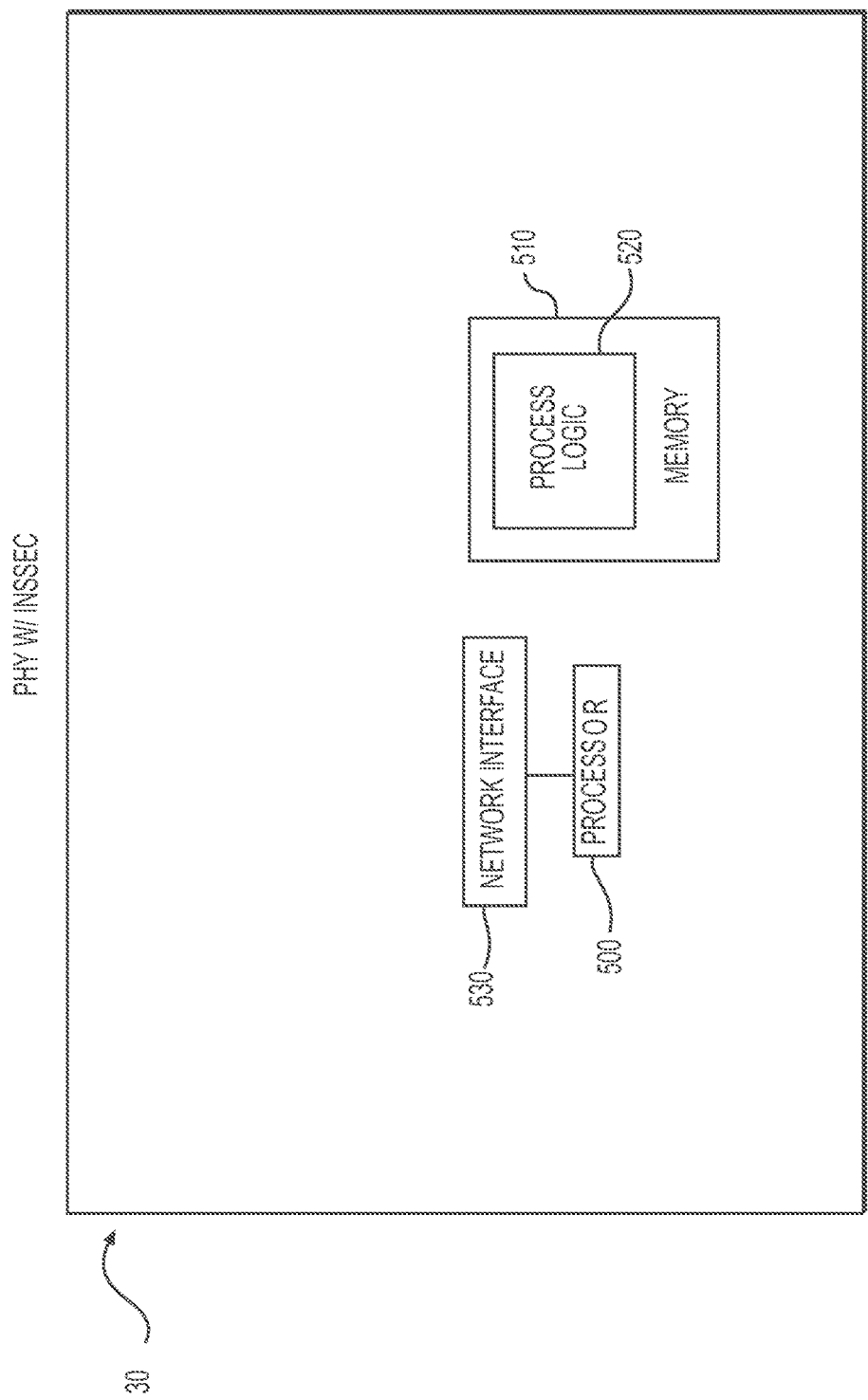
FIG. 5 is a block diagram illustrating an example configuration of an InsSec Physical (PHY) processing component of a local and/or remote switch (e.g., of FIG. 1) in accordance with an embodiment.

Some or all of the operations of the InsSec egress process 300 and the InsSec ingress process 400 shown in FIGS. 4A-B and 5 respectively, may be implemented in hardware with digital logic or in software. To this end, FIG. 5 shows an example of an InsSec PHY 30 comprising a processor 500 and a memory 510. In certain embodiments, the processor 500 and memory 510 may be used to perform some or all of the operations of the switch ASIC 20 in addition. Some or all of the operations of the InsSec egress process 300, the InsSec ingress process 400, or both, may be stored in memory process logic 520. In certain embodiments some or all of the operations of the InsSec egress process 300, the InsSec ingress process 400, or both are performed by an integrated circuit. Memory 510 may comprise read only memory (ROM), random access memory (RAM), magnetic disk storage media devices, optical storage media devices, flash memory devices, electrical, optical, or other physical/tangible memory storage devices. The processor 500 is, for example, a microprocessor or microcontroller that executes instructions for the process logic 520. Thus, in general, the memory 510 may comprise one or more tangible computer readable storage media (e.g., a memory device) encoded with software comprising computer executable instructions and when the software is executed (by the processor 500) it is operable to perform the operations described herein. A network interface unit 530 is connected to the processor to send packets to and receive packets from the Layer-2 network (VxLAN). Thus, it is to be understood that the network interface unit 530 can interface packets to be transmitted over the network from the InsSec egress 300 and can receive packets received from the network and supply the received packets to the InsSec ingress 400. Moreover, when one or more processing functions are implemented by software executed by the processor 510, then network interface unit 530 can be configured to interface between the processor 510 and the network.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus that generates an encrypted Virtual Extensible Local Area Network (VxLAN) packet for layer-2 data center interconnect, the apparatus comprising: a hardware network interface unit to send and receive packets from a network, wherein at least one of the received packets is a VxLAN based packet that at least includes: a Media Access Control (MAC) header, an Internet Protocol (IP) Header, either a User Datagram Protocol (UDP) header or a Transmission Control Protocol (TCP) header, a VxLAN header, a payload data, and a cyclic redundancy check (CRC); a processor coupled to the hardware network interface unit, wherein the processor transforms the VxLAN packet into an encrypted VxLAN packet by at least performing the steps comprising: encrypting the payload data of the VxLAN packet via a form of Media Access Control Security (MACSec); inserting a MACSec header after the UDP or TCP header of the VxLAN packet; and inserting an integrity check value (ICV) between the encrypted payload and the CRC of the VAAN packet, wherein the ICV is configured to cover, so as to be derived as an integrity checksum of, at least the MACSec header and the encrypted payload but not a MAC address of the MAC header.

2. The apparatus of claim 1, wherein the ICV is configured to cover, so as to be derived as an integrity checksum of, at least the MACSec header, the encrypted payload, and the UDP or TCP header, but not the MAC address of the MAC header.

3. The apparatus of claim 1, wherein the ICV is configured to cover, so as to be derived as an integrity checksum of, at least the MACSec header, the encrypted payload, the UDP or TCP header, and the IP header but not the MAC address of the MAC header.

4. The apparatus of claim 1, wherein the MACSec header includes an EtherType field, wherein the MAC Header includes an EtherType field, wherein the IP header includes a protocol field, wherein the UDP or TCP header includes a UDP or TCP length field, and a layer-4 destination port field comprising a layer-4 destination port number, and wherein the processor transforms the VxLAN packet into the encrypted VxLAN packet by further performing the steps comprising:

copying the layer-4 destination port number from the UDP or TCP header into the MACSec EtherType field;
overwriting the layer-4 destination port number of the UDP or TCP header layer-4 destination port field with a predefined layer-4 security port number that indicates that the encrypted VxLAN packet is carrying a given type of secured payload;
updating the UDP or TCP length field to reflected added bytes; and
replacing the CRC with a new CRC;
wherein the operation of inserting the MACSec header comprises inserting a MACSec header after the UDP or TCP header of the VxLAN packet and before the VxLAN header.

5. The apparatus of claim 4, wherein prior to encrypting the payload data of the VxLAN packet through the use of a form of MACSec, the processor: calculates an offset to use in the encryption according to the fields of the VxLAN packet; and retrieves an encryption key by accessing an entry in a key store table using a corresponding table key, wherein the table key is selected from a group consisting of a packet outer destination IP address, a packet outer source IP address, a packet outer VLAN ID, and combinations thereof.

6. The apparatus of claim 5, wherein the processor calculates the offset by: setting the offset initially to 16 bytes when a VLAN tag is detected and setting the offset initially to 12 when no VLAN tag is detected; incrementing by 28 bytes if the packet is an IPv4 packet incrementing by 48 bytes if the packet is an IPv6 packet; incrementing by 8 bytes if the packet is a UDP packet; and incrementing by 20 bytes if the packet is a TCP packet.

7. The apparatus of claim 5, wherein the processor:
receives a second packet from the hardware network interface unit;
determines whether the second packet is carrying a payload of the given type of secured payload by identifying whether the second packet has a UDP or TCP header that includes the predefined layer-4 security port number;
upon determining that the second packet includes the predefined layer-4 security port number, determine if there is a matching state in the key store table for the second packet;
upon determining that there is a matching state, decrypt the second packet and check the ICV; and
upon the ICV check passing, move the layer-4 destination port number from the MACSec EtherType field to the second packet's UDP or TCP header, remove the MACSec header from the second packet, correct the second packet's CRC, and pass the second packet to an application-specific integrated circuit (ASIC) switch or router.

8. The apparatus of claim 1, wherein the processor resides within an Application Centric Infrastructure (ACI) switch of an ACI fabric system.

9. The apparatus of claim 1, wherein the hardware network interface unit is an application-specific integrated circuit (ASIC) switch or router, and wherein the processor is a physical layer (PHY) device.

10. The apparatus of claim 9, wherein the PHY device is an ASIC that is external to the ASIC switch or router.

11. A method of generating an encrypted Virtual Extensible Local Area Network (VxLAN) packet for layer-2 data center interconnect, the method comprising: receiving packets from a network via a hardware network interface unit, wherein at least one of the received packets is a (VxLAN) based packet that at least includes: a Media Access Control (MAC) header, an Internet Protocol (IP) Header, either a User Datagram Protocol (UDP) header or a Transmission Control Protocol (TCP) header, a VxLAN Header, a payload data, integrity check value (ICV) and a cyclic redundancy check (CRC), wherein the ICV is configured to cover, so as to be derived as an integrity checksum of, at least the MACSec header and the encrypted payload but not a MAC address of the MAC header; transforming, by a processor, the VxLAN packet into an encrypted VxLAN packet by at least performing the steps comprising: encrypting, by the processor, the payload data of the VxLAN packet via a form of Media Access Control Security (MACSec); inserting, by the processor, a MACSec header after the UDP or TCP header of the VxLAN packet; and inserting, by the processor, an integrity check value (ICV) between the encrypted payload and the CRC of the VXLAN packet, wherein the ICV is configured to cover at least the MACSec header and the encrypted payload but not a MAC address of the MAC header.

12. The method of claim 11, wherein the ICV is configured to cover, so as to be derived as an integrity checksum of, at least the MACSec header, the encrypted payload, and the UDP or TCP header, but not the MAC address of the MAC header.

13. The method of claim 11, wherein the ICV is configured to cover, so as to be derived as an integrity checksum of, at least the MACSec header, the encrypted payload, the UDP or TCP header, and the IP header but not the MAC address of the MAC header.

14. The method of claim 11, wherein the MACSec header includes an EtherType field, wherein the MAC Header includes an EtherType field, wherein the IP header includes a protocol field, wherein the UDP or TCP header includes a UDP or TCP length field, and a layer-4 destination port field comprising a layer-4 destination port number, and wherein the transforming of the VxLAN packet into the encrypted VxLAN packet is performed by further performing at least the steps comprising: copying the layer-4 destination port number from the UDP or TCP header into the MACSec EtherType field; overwriting the layer-4 destination port number of the UDP or TCP header layer-4 destination port field with a predetermined layer-4 port number to indicate that the encrypted VxLAN packet is carrying a given type of secured payload; updating the UDP or TCP length field to reflected added bytes; and replacing the CRC with a new CRC; wherein the operation of inserting the MACSec header comprises inserting a MACSec header after the UDP or TCP header of the VxLAN packet and before the VxLAN header.

15. The method of claim 14, further comprising: prior to the step of encrypting the payload data of the VxLAN packet through the use of a form of MACSec: calculating an offset to use in the encryption according to the fields of the VxLAN packet; and retrieving an encryption key by accessing an entry in a key store table using a corresponding table key, wherein the table key is selected from a group consisting of a packet outer destination IP address, a packet outer source IP address, a packet outer VLAN ID, and combinations thereof.

16. The method of claim 15, wherein the step of calculating the offset comprises:
setting the offset initially to 16 bytes when a VLAN tag is detected and setting the offset initially to 12 when no VLAN tag is detected;
incrementing by 28 bytes if the packet is an IPv4 packet;
incrementing by 48 bytes if the packet is an IPv6 packet;
incrementing by 8 bytes if the packet is a UDP packet; and
incrementing by 20 bytes if the packet is a TCP packet.

17. The method of claim 15, further comprising:
receiving a second packet via the hardware network interface unit;
determining whether the second packet is carrying a payload of the given type of secured payload by identifying whether the second packet has a UDP or TCP header that includes the predetermined layer-4 port number;
upon determining that the second packet includes the predetermined layer-4 port number, determining if is there is a matching state in the key store table for the second packet;
upon determining that there is a matching state, decrypting the second packet and checking the ICV; and upon the ICV check passing, moving the layer-4 destination port number from the MACSec EtherType field to the second packet's UDP or TCP header, remove the MAC Sec header from the second packet, correct the second packet's CRC, and pass the second packet to an application-specific integrated circuit (ASIC) switch or router.

18. An apparatus for decrypting a Virtual Extensible Local Area Network (VxLAN) packet for layer-2 data center interconnect, the apparatus comprising:
  a hardware network interface unit to send and receive packets from a network;
  a processor coupled to the hardware network interface unit, wherein the processor:
  determines whether at least one of the received packets is an encrypted VxLAN packet carrying a secured payload of a given type by identifying whether the packet has a User Datagram Protocol (UDP) header or a Transmission Control Protocol (TCP) header that includes a predefined layer-4 security port number associated with the given type, wherein the encrypted VxLAN packet includes at least: a Media Access Control (MAC) header, an Internet Protocol (IP) Header, either a User Datagram Protocol (UDP) header or a Transmission Control Protocol (TCP) header, a Media Access Control Security (MACSec) header, a VxLAN header, an encrypted payload, a integrity check value (ICV), and a cyclic redundancy check (CRC), wherein the ICV is configured to cover, so as to be derived as an integrity checksum of, at least the packet's Media Access Control Security (MACSec) header and the packet's encrypted payload but not a MAC address of the packet's MAC header, wherein the MACSec header includes an EtherType field to a second packet's UDP or TCP header;
  upon determining that the encrypted VxLAN packet includes the predefined layer-4 security port number, decrypt the secure payload of the encrypted VxLAN packet and check the ICV; and
  upon the ICV check passing, move the layer-4 destination port number from the MACSec EtherType field to the UDP or TCP header, remove the MACSec header, correct the CRC, and pass a resulting packet to an application-specific integrated circuit (ASIC) switch or router.

19. The apparatus of claim 18, wherein the hardware network interface unit is an application-specific integrated circuit (ASIC) switch or router, and wherein the processor is a physical layer (PHY) device.

20. The apparatus of claim 19, wherein the PHY device is an ASIC that is external to the ASIC switch or router.

* * * * *